United States Patent [19]
Anderson

[11] 3,967,406
[45] July 6, 1976

[54] FISH LURE

[76] Inventor: Ray C. Anderson, 6655 S. New Haven, Tulsa, Okla. 74136

[22] Filed: Mar. 10, 1975

[21] Appl. No.: 556,793

[52] U.S. Cl. .............................................. 43/42.24
[51] Int. Cl.² ........................................ A01K 85/00
[58] Field of Search ........................... 43/42.24, 42.1

[56] References Cited
UNITED STATES PATENTS

| | | | |
|---|---|---|---|
| 3,199,244 | 8/1965 | Frederiksen, Sr. | 43/42.1 |
| 3,440,757 | 4/1969 | McClellan | 43/42.24 |
| 3,685,197 | 8/1972 | McClellan | 43/42.24 |

*Primary Examiner*—Louis G. Mancene
*Assistant Examiner*—Daniel J. Leach
*Attorney, Agent, or Firm*—Head, Johnson & Chafin

[57] ABSTRACT

A fish lure that comprises a flexible molded product in the contour and coloring of a small fish, such as a minnow. There are no fixed attachments to the lure. Means are provided inside the molded product to provide tensile strength to the lure, so that hooks or other attachments can be inserted directly through the body of the lure and through holes within the internal strengthening material, so as to provide the necessary tensile strength to the object while in use. Internal strengthening means can comprise a thin sheet of metal or plastic with prepared openings therein. Another form of internal strengthening is to use a plurality of grommets which are tied together with wire inside of the molded products. A third embodiment uses a sheet of wire gauze cut to the shape of the lure and molded inside the lure.

4 Claims, 4 Drawing Figures

FISH LURE

BACKGROUND OF THE INVENTION

This invention lies in the field of fishermen's products. More particularly it concerns the design of a lure which is useful to the fisherman, in the sense that he can apply hooks or other attachments in any selected position, so as to change the operating characteristics of the lure.

In the prior art there are many types of lures and similar devices available to fishermen for use in attracting fish to a fishhook. Substantially all of these provide attached fishhooks which are fixed in position on the lure, and do not provide opportunity for the fisherman to select his own geometry of hooks or other attachments. Thus, it is not possible for a fisherman to design his own lure about the central object, or mechanical portion of the lure, to which hooks and other attachments can be applied.

SUMMARY OF THE INVENTION

It is a primary object of this invention to provide a lure for fishermen in the shape, contour and coloring of a small fish, such as a minnow, to which the fisherman can add hooks or other devices or attachments, to his own design, so as to provide a more effective lure for enticing fish to the fishhooks.

This and other objects are realized and the limitations of the prior art are overcome in this invention by using a simple lure molded of a compliant flexible material in the shape, contour and coloring of a small fish, to attract fish to the fishhook. There are no attachments to the lure, and all that is available is the simulated fish, which is similar to an actual fish.

In use, the fisherman can apply fishhooks of any shape or size to the lure in any desired position. For example, the hook can be pressed through the head portion of the lure, so that the fish will stream behind the hook. Alternatively, the hook can be pushed through the lure near the tail end, so that the fish will be carried by the tail, and can be swallowed head first by the approaching fish.

The material of which the lure is molded would be any conventional material sufficiently soft and flexible so that the fishhook can be pressed through the lure.

The material of which the lure is made need not have a high tensile strength of its own, and it can be given tensile strength in any one of a number of ways, such as for example molding inside of the lure within the outer contour, a sheet of metal or plastic having considerable tensile strength, through which a number of openings have been provided. Means can be provided on the outside surface for marking the position of these openings, so that a hook or other attachment can be pressed through the soft molding material and through the opening of the central strengthening insert.

Another method of improving the tensile strength to the lure is to use a plurality of grommets which provides holes through the fish, the grommets being tied together by wire so as to provide the desired tensile strength. Another embodiment involves the use of a metal gauze of thin wire which has tensile strength and flexibility. With this strengthening material the hooks or other attachments can be pressed through the body of the lure at any desired point, since there will always be a small window through which the hook can pass.

BRIEF DESCRIPTION OF THE DRAWINGS

These and other objects and advantages of this invention and a better understanding of the principles and details of the invention will be evident from the following description, taken in conjunction with the appended drawings, in which.

DESCRIPTION OF THE PREFERRED EMBODIMENT

Figure 1:
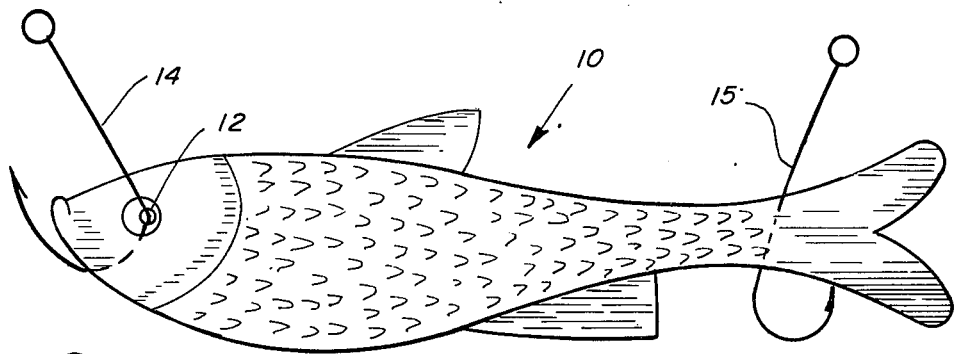
FIG. 1 shows the external view of the lure of this invention.

Referring now to the drawings and in particular to FIG. 1, there is shown one embodiment of this invention indicated generally by the numeral 10. This invention comprises a molded product in the shape, contour and coloring of a small fish, such as a minnow. There are no attachments to this product, and it can be used with a simple hook pressed through the molded material at any joint within the contour, so that the lure looks exactly like a small fish. FIG. 1 shows a hook 14 passing through the eye 12 of the minnow. Obviously, the hook 14 can be put in any position within the outer contour of the fish, including its tail end, as indicated by the hook 15.

Figure 2:
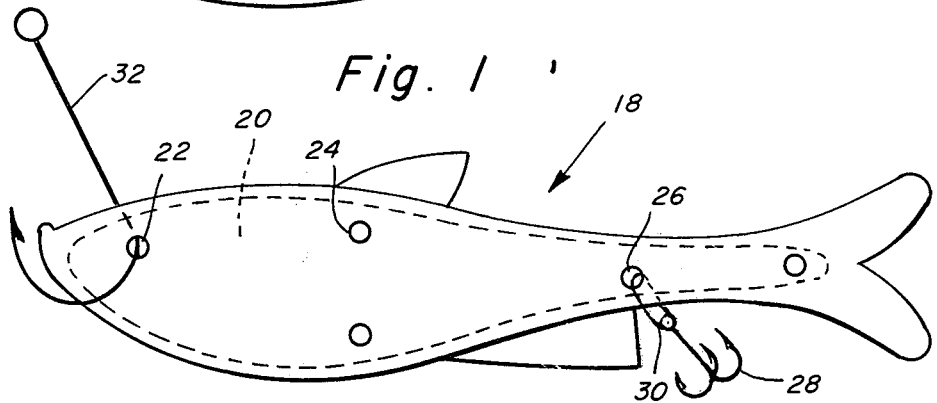
FIG. 2 shows the outline of the lure with an insert shown in dotted outline inside of the molded product.
Figure 3:
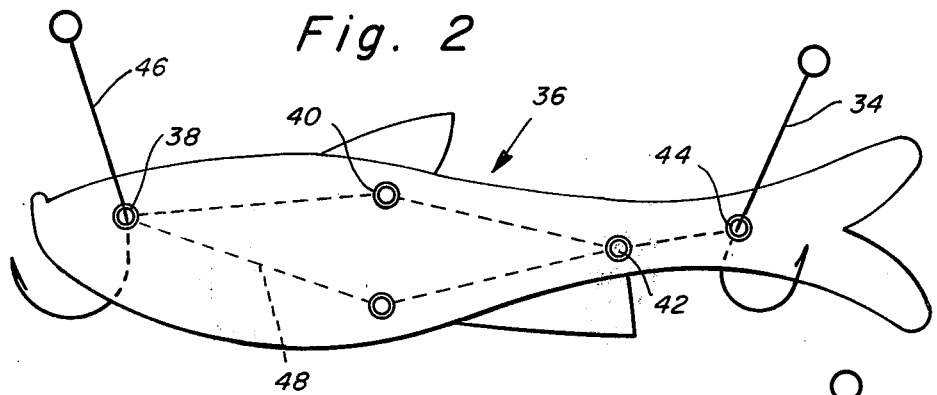
FIG. 3 illustrates the use of a plurality of grommets tied together by wire, molded inside of the product.
Figure 4:
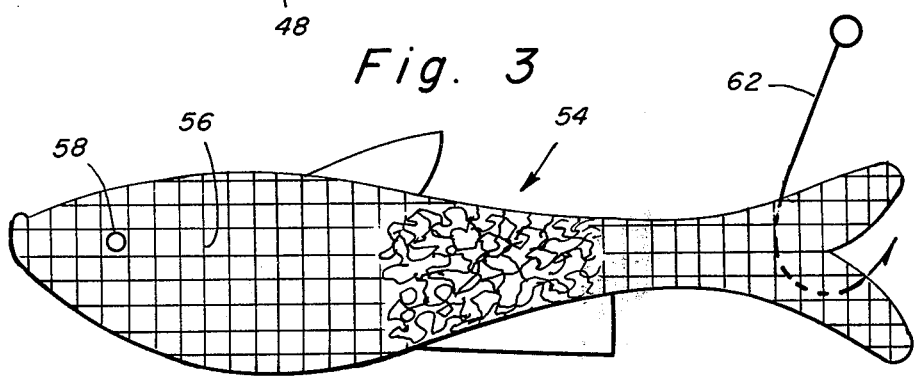
FIG. 4 shows the outline of the product with a small mesh of fine metal wire as an insert molded into the product to provide the tensile strength.

The particular object of this lure is the precise appearance of a fish, unmarred by any attachments except as selected by the fisherman himself. In order to provide sufficient tensile strength to the lure, means are molded in the inside of the product, to provide the tensile strength required. FIGS. 2, 3 and 4 show different embodiments of the internal reinforcing material.

In FIG. 2, the lure is indicated generally by the numeral 18. There is shown the use of a flat sheet 20 of thin metal or plastic, with a plurality of openings, 22, 24, 26, etc. The position of the openings 22, 24, etc. can be indicated on the outside surface of the fish by means of a small dimple, or by a matter of coloring, etc., or, if the plastic is semi-translucent, the position of the hole can be verified by sighting through the lure against a bright light. A hook, such as indicated by 32, can be inserted through one of the openings such as 22 in use. It is possible also to use other attachments such as the hooks 28 attached through the opening 26 by means of a wire loop 30 or other means.

FIG. 3 shows another embodiment indicated by the numeral 36, in which a plurality of grommets of metal 38, 40, 42, 44, etc. are provided at selected positions along the length of the lure. These grommets are wired together by means of a thin flexible wire 48, which ties them together and prevents the grommets from being torn out of the molded material due to severe pull on the fishhook, for example. This embodiment provides a clear indication on the outside surface of the location of the openings. A hook such as 46 can be inserted through the opening 38, or a hook 34 can be inserted through the opening in the tail 44.

FIG. 4 shows another embodiment 54 in which the reinforcing material is a mesh of fine wire 56. Since the molding material is soft and pliant, and the sharp hook can be inserted through it, the mesh provides a multitude of small openings, essentially at any desired position in the molded product. A hook 62, or other attachment, can be inserted at any desired point and still provide sufficient tensile strength for the use of the lure in fishing. Opening 58 is positioned to simulate the eye of the fish shaped lure.

Also shown as part of FIG. 4 is an embodiment in which the tensile material is a random array of loose strands or threads of plastic or metal. While they are loose threads laid on in ramdom spacing and direction when molded into the plastic they become interlocked to provide the desired tensile material. This matt or layer of interlaced threads can be used in conjunction with the mesh, or preferably in place of the mesh.

The essential feature of this invention lies in the use of a simulated fish, reproduced in realistic shape and color without any attachments whatsoever, except as the fisherman himself desired to add them. The product is made in a way so as to facilitate the addition of these hooks, or other fixtures, by the fisherman himself.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claims, including the full range of equivalency to which each element or step thereof is entitled.

What is claimed:

1. A fish lure comprising:
   a molded product of a fish attracting shape; and
   and internal flexible wire connecting a plurality of small metal grommets disposed at spaced locations in the molded product forming opening through which fish hooks or other attachments may be inserted.

2. A fish lure as in claim 1 including means marked on the outer surface of said lure to indicate the position of said spaced locations of said grommets.

3. A fish lure as in claim 2 in which said marking means is in the form of dimples in the surface of the molded product.

4. A fish lure comprising:
   a molded product of fish attracting shape; and
   a woven mesh of small diameter wire of a size and shape to be within the contour of the molded product, the openings in the mesh of wire forming means by which fish hooks or other attachments may be inserted.

* * * * *